United States Patent [19]
Leach et al.

[11] Patent Number: 5,009,964
[45] Date of Patent: Apr. 23, 1991

[54] COMPOSITION AND PROCESS FOR IMPARTING FIRE RETARDANT PROPERTIES AND IMPROVED THERMAL STABILITY TO CELLULOSIC MATERIALS

[75] Inventors: Robert M. Leach, Grand Island; Michael J. Richards, Williamsville, both of N.Y.

[73] Assignee: Osmose Wood Preserving, Inc., Buffalo, N.Y.

[21] Appl. No.: 378,408

[22] Filed: Jul. 11, 1989

[51] Int. Cl.$^5$ ............................................. B32B 27/42
[52] U.S. Cl. ................................ 428/526; 106/18.14; 106/18.21; 252/607; 427/439; 427/440; 428/528; 428/530; 428/921
[58] Field of Search ......................... 106/18.14, 18.21; 252/607, 608; 427/393.3, 439, 440; 428/526, 528, 530, 921

[56] References Cited

U.S. PATENT DOCUMENTS

| | | | |
|---|---|---|---|
| 2,482,756 | 9/1949 | Ford et al. | 8/116.3 |
| 2,488,034 | 11/1949 | Pingree et al. | 117/136 |
| 3,939,107 | 2/1976 | Brown | 428/528 X |
| 4,301,217 | 11/1981 | Rohringer et al. | 428/528 |
| 4,373,010 | 2/1983 | Oberley | 428/532 |
| 4,806,620 | 2/1989 | Klett et al. | 106/18.15 |
| 4,839,099 | 6/1989 | Umehara et al. | 427/393.3 X |

Primary Examiner—Michael Lusignan
Attorney, Agent, or Firm—Edwin T. Bean, Jr.; Martin G. Linihan; Alan S. Korman

[57] ABSTRACT

A process is provided for forming a fire retardant composition useful for treating cellulosic materials to impart both fire retardant properties and improved thermal stability under high temperature and humidity conditions. The process comprises reacting a solution of orthophosphoric acid, urea and water having a weight ratio from about 0.1 to about 15 orthophosphoric acid per part urea for a time of about 15 minutes to about 3 hours at a temperature from about 25° C. to about 90° C.; adding hydroxide in an amount sufficient to adjust the pH of the solution from about 6.0 to about 9.0; reacting the solution with formaldehyde having a weight ratio from about 1.0 to about 56 total initial orthophosphoric acid per part formaldehyde for a time of about 5 minutes to about 1.5 hours at a temperature from about 25° C. to about 90° C., and adjusting the final pH of the solution from about 7.0 to about 8.5 with ammonium hydroxide.

In another aspect thereof, the present invention provides a method of treating cellulosic materials comprising impregnating the cellulosic material with a fire retardant amount of the fire retardant composition formed in accordance with the above process.

22 Claims, 4 Drawing Sheets

COMPOSITION AND PROCESS FOR IMPARTING FIRE RETARDANT PROPERTIES AND IMPROVED THERMAL STABILITY TO CELLULOSIC MATERIALS

FIELD OF THE INVENTION

This invention relates generally to a formulation and process for imparting fire retardant properties to cellulosic materials and, more particularly, to a new and improved fire retardant composition for treating cellulosic materials to impart both fire retardant properties and thermal stability under high temperature and humidity conditions.

BACKGROUND OF THE INVENTION

Cellulosic materials, such as wood, paper, rayon and cotton, are used extensively in industry, public places and in the home as materials of construction or for decorative applications. All of these materials are highly flammable and require some form of treatment to impart fire retardant or flame resistant properties.

The conventional method for treating wood to impart fire retardant properties is pressure impregnation with fire retardant chemicals. The resulting wood is then kiln dried or air dried to a moisture content of 20% or less. Recently, it has been discovered that wood treated with currently available fire retardant formulations undergoes loss of structural strength. It is believed that this loss is the result of thermal degradation of the wood due to high temperature and humidity conditions. Many fire retardant formulations contain inorganic and organic phosphates. Typical inorganic phosphates consist of monoammonium phosphate, diammonium phosphate, ammonium polyphosphate or some combination thereof. These phosphates can cause the treated wood to thermally degrade under high temperature and humidity conditions. It is believed that ammonium phosphates, which are one type of ingredient commonly used in fire retardant formulations used to treat cellulosic materials, such as wood, may be responsible for the thermal degradation problem with this fire retardant treated wood. In this connection, it is believed that these ammonium phosphates when exposed to high temperature and humidity conditions for prolonged periods of time, as encountered in some roofing systems, may undergo hydrolysis to phosphoric acid. This phosphoric acid in turn reacts with the wood components causing the wood to char and become brittle, which ultimately results in the reduction of the strength properties of the wood. Similar effects have also been noted with some organic phosphates.

One such fire retardant formulation is that disclosed in U.S. Pat. No. 4,301,217. The formulation comprises an aqueous preparation which contains at least one water soluble ammonium salt of an inorganic acid such as ammonium sulfate or ammonium phosphate, at least one water soluble cationic reaction product of dicyandiamide or formaldehyde, and optionally an ammonium salt and an alkylenepolyamine. The wood is impregnated with the preparation using a single bath process or, alternatively, a two bath process and subsequently dried. It is believed that wood treated with this formulation may undergo thermal degradation due to hydrolysis of the ammonium sulfate or ammonium phosphate under high temperature and humidity conditions.

U.S. Pat. No. 2,482,756 discloses another formulation used for flame proofing fiberous materials which comprises mixing orthophosphoric acid and urea and heating the mixture to a temperature of from about 260° F. to about 400° F., preferably to about 365° F. Thereafter, water, ammonia and an aldehyde are added to the solution. The fiberous material is then impregnated with the solution, dried and cured. The material impregnated with this formula exhibits durable flame proof properties. However, during the heating process, complex reactions take place between the phosphoric acid and urea and between the acid and the products formed by the alteration of the urea at the high temperatures such that carbon dioxide, ammonia and water are liberated. Thus, the urea is decomposed during heating, and consequently, any phosphoric acid resulting from the decomposition of the urea -phosphate complex will be neutralized by ammonia. This will result in the formation of ammonium phosphates. These ammonium phosphates will ultimately lead to the thermal degradation of the treated cellulose product. Furthermore, the formulation disclosed in U.S. Pat. No. 2,482,756 utilizes salts of strong acids with volatile bases, such as ammonium phosphate. As previously noted the presence of ammonium phosphate will result in thermal degradation of the cellulosic material when exposed to high temperature and high humidity conditions for an extended period of time.

Therefore, it would be desirable to provide a new and improved fire retardant composition for treating cellulose materials whereby the resulting treated wood exhibits good fire retardant properties and thermal stability when exposed to high temperature and humidity conditions.

OBJECTS AND SUMMARY OF THE INVENTION

Accordingly, it is a primary object of the present invention to provide a new and improved fire retardant composition useful for treating cellulosic materials to impart fire retardant properties and thermal stability under high temperature and humidity conditions to the materials.

It is a further object of the present invention to provide a process for formulating the new and improved fire retardant composition of the present invention.

It is a more particular object of the present invention to provide a cellulosic material that when treated with the fire retardant composition of the present invention exhibits low hygroscopicity.

It is a more particular object of the present invention to provide various concentrations of aqueous solutions of the fire retardant composition of the present invention for vacuum/pressure impregnation of cellulosic materials.

The present invention provides a process for forming a fire retardant composition useful for treating cellulosic materials to impart both fire retardant properties and improved thermal stability under high temperature and humidity conditions which comprises:

(a) reacting a solution of water, an oxy acid of phosphorus and a nitrogen containing compound selected from the group consisting of urea, melamine, mono, di and trimethylamine, mono, di, and triethylamine, dicyandiamide, hexamethylenetetramine and other equivalent nitrogen containing compounds in a weight ratio of about 0.1 to about 15 oxy acid per part nitrogen compound for a time of about 15 minutes to about 3 hours at a temperature from about 25° C. to about 90° C.;

(b) adjusting the pH of said solution from about 6.0 to about 9.0 with a water soluble alkaline compound selected from the group consisting of ammonia, ammonium hydroxide, mono, di and trimethylamine, mono, di and triethylamine and ethanolamine or other equivalent alkaine compounds;

(c) reacting said solution with an aldehyde compound selected from the group consisting of formaldehyde, acetaldehyde, and glyoxal in a weight ratio of about 1.0 to about 56 total initial oxy acid per part aldehyde compound for a time of about 5 minutes to about 1.5 hours at a temperature from about 25° C. to about 90° C.; and (d) adjusting the final pH of said solution from about 7.0 to 8.5 with a water soluble alkaline compound selected from the group consisting of ammonia, ammonium hydroxide, mono, di and trimethylamine, mono, di and triethylamine and ethanolamine or other equivalent alkaine compounds.

More preferably, the present invention provides a process for forming a fire retardant composition useful for treating cellulosic materials to impart both fire retardant properties and improved thermal stability under high temperature and humidity conditions which comprises:

(a) reacting a solution of water, orthophosphoric acid and urea in a weight ratio of about 0.1 to about 15 orthophosphoric acid per part urea for a time of about 15 minutes to about 3 hours at a temperature from about 25° C. to about 90° C.;

(b) adjusting the pH of said solution from about 6.0 to about 9.0 with a water soluble alkaline compound selected from the group consisting of ammonia, ammonium hydroxide, mono, di and trimethylamine, mono, di and triethylamine and ethanolamine;

(c) reacting said solution with formaldehyde in a weight ratio of about 1.0 to about 56 total initial orthophosphoric acid per part formaldehyde for a time of about 5 minutes to about 1.5 hours at a temperature from about 25° C. to about 90° C.; and (d) adjusting the final pH of said solution from about 7.0 to 8.5 with a water soluble alkaline compound selected from the group consisting of ammonia, ammonium hydroxide, mono, di and trimethylamine, mono, di and triethylamine and ethanolamine.

The wood treated with the fire retardant composition formed in accordance with the above processes exhibits excellent fire retardant properties and improved thermal stability when exposed to high temperature and humidity conditions.

In another aspect thereof, the present invention provides a method of treating a cellulosic material comprising impregnating the cellulosic material with a fire retardant amount of the fire retardant composition comprised in accordance with the process described herein.

DETAILED DESCRIPTION OF THE INVENTION

Figure 1:
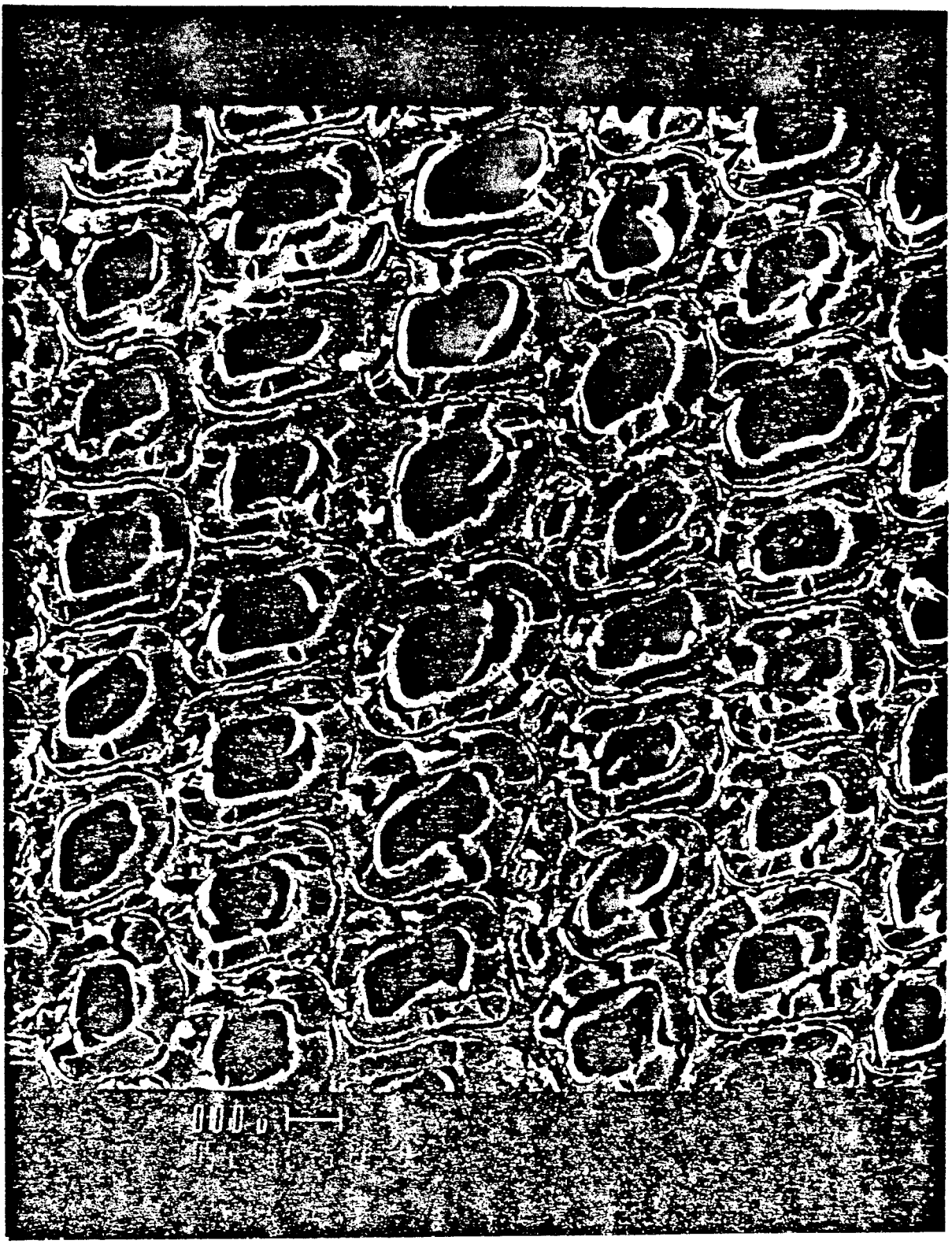
FIG. 1 shows a photograph examining the cellular structure by scanning electron microscopy of southern pine wood treated with a commercially available fire retardant formulation and placed in a temperature/humidity chamber at 80° C. and a relative humidity of 64% for five weeks.

This invention is directed to a process for forming a fire retardant composition and a method for imparting fire retardant properties and thermal stability to cellulosic materials. More specifically, this invention relates to the vacuum/pressure impregnation of cellulosic materials with an aqueous solution of the fire retardant composition formed in accordance with the process described herein. While the disclosure of this invention is directed to the fire retardant treatment of wood, it is understood that other cellulosic materials, such as paper, rayon, cotton, etc. may also be treated with the fire retardant composition of the present invention. The resulting treated wood exhibits fire retardant properties and does not undergo thermal degradation when exposed to high temperature and humidity conditions. Furthermore, the hygroscopicity of the wood treated with the fire retardant composition of the present invention is low. A fire retardant formulation containing over 15% urea has been reported to be hygroscopic. In this connection, urea by itself is hygroscopic and one would expect the wood treated with the fire retardant composition of this invention to be hygroscopic because the formulation contains about 32% urea on a total solids basis. However, it appears that the reaction of the orthophosphoric acid with urea to form what is believed to be a urea/phosphate salt or complex, plus the additional reaction of this compound with formaldehyde, results in the formation of a compound or compounds which have low hygroscopicity.

The process of forming the fire retardant composition of this invention generally consists of reacting a water-soluble inorganic acid compound with a nitrogen containing compound, adjusting the pH of the solution with a water-soluble alkaline compound, and thereafter reacting the solution with an aldehyde compound, and a final pH adjustment. The water-soluble inorganic acid compound is selected from the class of oxy acids of phosphorus such as hypophosphorus acid, phosphorous acid, phosphoric acid, hypophosphoric acid and pyrophosphoric acid, or other equivalent oxy acids, such as the oxy acids of sulfur, and most preferably is orthophosphoric acid. The nitrogen containing compound most preferred for use in forming the fire retardant composition is urea. In addition, other compounds similar to urea can be used as a substitute nitrogen source, provided that these substitutes are reactive, stable and soluble in the composition. Such substitute compounds include melamine, mono, di and trimethylamine, mono, di, and triethylamine, dicyandiamide, hexamethylenetetramine and similar compounds.

The orthophosphoric acid and urea produce what is believed to be a urea-phosphate salt or complex. The pH of this solution is then adjusted with a water-soluble alkaline compound such as ammonia on the order of about 3.0 moles of ammonia per mole of orthophosphoric acid, and most preferably ammonium hydroxide. It is noted that the ammonium hydroxide in addition to adjusting the pH of the solution also undergoes reaction with the formaldehyde to provide a supplemental nitrogen source during formation of the fire retardant composition. Therefore, other nitrogen compounds may be substituted for the ammonium hydroxide, such as mono, di and trimethylamine, mono, di and triethylamine and ethanolamine provided that these substitutes are reactive with the reaction intermediates and are stable and soluble in the fire retardant system. Thereafter, an aldehyde selected from the group consisting of formaldehyde, acetaldehyde, and glyoxal, most preferably formaldehyde, is added to the solution to produce what is believed to be a phosphate-urea-formaldehyde complex. A final pH adjustment is made with ammonium hydroxide or the substituted nitrogen compound It has been discovered that the reaction of the urea and formaldehyde with orthophosphoric acid in accordance with the process described herein produces a product with improved stability to hydrolysis. That is, the contained phosphate does not hydrolysize to phosphoric acid when the treated wood is exposed to elevated temperatures and humidities for extended periods of time.

The orthophosphoric acid, water and urea should be reacted at a temperature from about 25° C. to about 90° C., but preferably at a temperature from about 60° C. to about 70° C. The reaction time between the urea and orthophosphoric acid should be from about 15 minutes to about 3 hours, preferably about 1½ hours. Sufficient ammonium hydroxide is then added to raise the pH of the phosphate-urea solution to between about 6.0 to about 9.0, but preferably to about 8.0. During the addition of the ammonium hydroxide the temperature of the solution should be maintained from between about 25° C. to about 90° C., preferably at about 70° C. Thereafter, the addition of the formaldehyde should be in such a manner that the pH of the solution does not drop below 6, and preferably not below 6.5. If the pH of the solution drops below 6, a polymerization reaction between the phosphate urea complex and the formaldehyde will occur resulting in the precipitation of a resinous product. The reaction time between the formaldehyde and the urea-phosphate salt should be from about 5 minutes to about 1 1/2 hours, but preferably about 30 minutes. The urea-phosphate salt and formaldehyde should be reacted at a temperature between about 25° C. and about 90° C., and most preferably, at a temperature of from about 60° C. to about 70° C. A final solution pH adjustment is then made with ammonium hydroxide after the formaldehyde reaction has gone to completion. The final pH of the solution should be adjusted to the range of about 7.0 to about 8.5, and preferably from about 7.5 to about 8.0. If the pH is less than 7.0, a resinous product will precipitate after several weeks of storage which is insoluble and has been found to contain 18.86% $P_2O_5$ and 31.59% nitrogen. Alternatively, if the solution pH is raised above 8.5, a crystalline product may form because of solubility restrictions. The crystalline product was found to be water soluble and to contain 49.84% $P_2O_5$ and 22.24% nitrogen.

The fire retardant composition formed in accordance with the above process should contain orthophosphoric acid and urea in a weight ratio of from about 0.1 to about 15, preferably from about 1.0 to about 2.0. The most preferred weight ratio is 1.3, which represents an orthophosphoric acid to urea mole ratio of about 1.0.

The formaldehyde content of the fire retardant composition should be in a weight ratio of the total initial orthophosphoric acid to formaldehyde of from about 1.0 to about 56, preferably from about 1.5 to about 10, and more preferably from about 1.5 to about 7.0. The most preferred weight ratio is 4.0, which represents a total initial orthophosphoric acid to formaldehyde mole ratio of about 1.5.

The fire retardant composition formulated in accordance with the above process is then diluted with an aqueous solvent, typically water, and preferably zeolite or demineralized softened water, to prepare a treating solution for impregnating cellulosic materials therewith. The $P_2O_5$ content of the treating solution should be from about 0.5% to about 10%, with a preferred range of about 2% to about 6%, and a most preferred range of about 2.5% to 5%. The pH of the treating solution should be maintained between about 7.0 and about 8.5, with a preferred range of from about 7.5 to 8.0, and a most preferred range of from about 7.8 to 8.0. If the pH of the treating solution is allowed to drop below 7.0, an insoluble resinous product may precipitate from solution during long term storage. If the pH of the treating solution requires adjustment, this may be accomplished by the addition of a small amount of ammonium hydroxide.

The treating solution may be applied to the cellulosic material such as wood by dipping, soaking or brushing. In addition, vacuum and/or pressure techniques may be used to impregnate the wood including both the Empty Cell process and the Full Cell process, both of which are well known to those skilled in the art.

The Full Cell (or Bethell) Process is employed in the creosoting of railway sleepers and marine timbers, and is the normal method of treatment of any class of timber with waterborne preservatives and may be used with the treating solution of this invention. This process has been in continuous use since 1838 and consists of first subjecting the timber in a cylinder to a vacuum of up to 28" of mercury for one-half to one hour, then filling the cylinder with the treating solution of the present invention and applying a pressure of up to 180-200 pounds per square inch until the required amount of treating solution has been injected into the timber. The cylinder is then emptied of treating solution and the treated timber optionally subjected to a short final vacuum to clean up the surface of the timber. It is usual to heat the treating solution throughout the treatment to a temperature of about 65° C. to about 95° C., as penetration is better when the treating solution is hot. As in all pressure processes, the pressure period is by far the most important factor affecting the amount and depth of impregnation. In practice, it is the magnitude and duration of the pressure that governs the absorption of the treating solution by the timber. In the early stages of the pressure period, the absorption by the timber is fairly uniform, but then it gradually slows down until the absorption is too slow to be readily observed. When this point is reached, the timber is said to have been treated to refusal. The rate of absorption varies greatly with different species of timbers. For example, beech or coriscan pine will be completely impregnated within a few minutes, while other species such as Douglas-fir, larch or oak heartwood are not completely penetrated even when under pressure for several days.

The Empty Cell treatment method also known as the Rueping process uses an initial air pressure, and is the standard method for creosotinq transmission poles. This method of treatment is also used for wood paving blocks, fencing and building timbers, and may be used with the treating solution of this invention. The Rueping treatment was introduced about 1912 and differs from the Full Cell method in that the timbers are initially subjected to compressed air instead of a vacuum. The cylinder is then filled with the treating solution of the present invention while maintaining this pressure, and the pressure is subsequently increased with a hydraulic pump until the desired amount of treating solution has been injected into the timber. The pressure is then released and the air compressed in the interior of the timber is allowed to escape, and in so doing, expels the excess liquid leaving the cell walls coated with the treating solution. This method of treatment allows a deep impregnation of the timber without a heavy absorption of the treating solution. The compression of the air originally in the wood serves to recover a small amount of the injected treating solution when the pressure is released. A long final vacuum is also used to assist impregnation.

Prior to impregnating wood with the treating solution of the present invention, it is essential to season the wood until at least all the free water has been removed from the cell spaces. This stage of seasoning results in a moisture content of about 25–30%, varying slightly with different species. Seasoning is required because it is not possible to inject another liquid into wood containing too much water, and checks developing as a result of the subsequent drying of the timber would almost certainly expose untreated timber.

Furthermore, the cellulosic material, wood, treated in accordance with either process described above is either air dried or dried at a temperature not to exceed 200° F. for the purpose of removing the excess water. That is, the drying procedure should not exceed a temperature that would remove reacted or combined ammonia, which would free up formaldehyde. The phosphorus-urea-formaldehyde resin should be retained chemically intact. Accordingly, curing of the chemical i.e., reaction of the fire retardant composition treating solution with the cellulose substrate is not required.

The treating solution utilized above with the Full Cell and Empty Cell processes was applied to the cellulosic materials in a one step treatment application. However, it is within the scope of the present invention, although less economical, to treat the cellulosic materials in a two step treatment process. In the two step treatment process, the wood is first treated with a treating solution containing the urea-phosphate salt or complex and ammonia (ammonium hydroxide), dried if desired, and then treated further with a formaldehyde/ammonia solution and then dried. It is also conceivable that the wood could first be treated with the formaldehyde/ammonia solution, followed by treatment with the urea-phosphate and ammonia solution. For carrying out the two step treatment process the treating solutions contain respective amounts of components and are employed at temperatures and pH ranges as referred above.

For example, a urea-phosphate solution is prepared by reacting 38.7 grams of 85% orthophosphoric acid and 25 grams of water with 25 grams of urea for 60 minutes at 30° C. Twenty grams of 29% ammonium hydroxide is added to the solution. After reaction of the ammonia, 666 grams of water is added to produce a 3% $P_2O_5$ treating solution. The 3.0% $P_2O_5$ treating solution is used to treat southern pine tube sticks. Initially, the wood is subjected to a 15 minute vacuum at 28" of mercury. The retort is filled with the 3.0% $P_2O_5$ fire retardant treating solution and pressurized to 140 psi for 20 minutes. A final vacuum is applied and the wood removed from the retort and allowed to air dry to a moisture content of 20%. The wood is thereafter subjected to a second vacuum/pressure treatment with a solution containing 1.5% formaldehyde and 1.0% ammonia. The wood is then dried at 120° F. overnight and should exhibit fire retardant properties and improved resistance to thermal degradation.

Another example of the two step treatment process would be to subject Douglas-fir plywood sections (2"×2"×½) to vacuum/pressure impregnated with a 4.0% $P_2O_5$ urea-phosphate solution which is neutralized to pH 5.5 with ammonia. The treated wood is dried at 150° F. until a moisture content of 19% or less is obtained. The wood is thereafter subjected to a second vacuum/pressure cycle and treated with a solution containing 2.0% formaldehyde and 1.5% ammonia. The resulting treated wood is dried at 150° F. to a moisture content of 19% and should be found to exhibit fire retardant properties and improved resistance to thermal degradation when exposed to high temperature and relative humidity for an extended period of time.

A further example of the two step treatment process would be to subject southern pine tube sticks to a vacuum of 28" of mercury for 30 minutes. The retort is then filled with a solution containing 1.5% formaldehyde and 1.0% ammonia and subjected to a pressure of 145 psi for 20 minutes. The wood is air dried to a moisture content of 20%. The tube sticks are thereafter subjected to a second vacuum/pressure cycle and treated with a 3.0% $P_2O_5$ urea/phosphate/ammonia solution, and dried at 150° F. to a moisture content of 17.5%. The treated wood should exhibit fire retardant properties and improved resistance to thermal degradation when exposed to high temperature and humidity conditions for an extended period of time.

The method of treating cellulosic materials to impart fire retardant properties and improved thermal stability under high temperature and humidity thereto comprising impregnating the cellulosic material with the fire retardant composition comprised in accordance with the process described above will become more apparent with reference to the following examples.

EXAMPLE 1

A 13.7% $P_2O_5$ fire retardant composition was prepared by reacting 77.3 grams of 85% orthophosphoric acid, 59.5 grams water, and 50.0 grams of urea for one hour at 70° C. The pH of this solution was raised from 0.9 to 7.9 by the addition of 96.6 grams of 29% ammonium hydroxide. The solution was then reacted with 64.2 grams of 37% formaldehyde for one-half hour at 70° C. The final pH of the solution after complete reaction of the formaldehyde was 6.55. 1,000 grams of a 4% $P_2O_5$ treating solution was then prepared by diluting 292 grams of the prepared 13.7% $P_2O_5$ composition with 708 grams of water. The final pH of the treating solution was adjusted to 8.0 with the addition of ammonium hydroxide.

EXAMPLE 2

A 13.7% $P_2O_5$ fire retardant composition was prepared by reacting 77.3 grams of 85% orthophosphoric acid, 46.2 grams water and 50.0 grams of urea for 15 minutes at 25° C. The pH of the solution was then raised from 0.86 to 8.1 by the addition of 109.9 grams of 29% ammonium hydroxide. The solution was then reacted with 64.2 grams of 37% formaldehyde for 15 minutes at 25° C. The final pH of the solution after complete reaction of formaldehyde was 7.54. 1,000 grams of a 2.5% $P_2O_5$ treating solution was then prepared by diluting 182.5 grams of the prepared 13.7% $P_2O_5$ composition with 817.5 grams of water.

EXAMPLE 3

A 12.6% $P_2O_5$ fire retardant composition was prepared by reacting 231.9 grams of 85% orthophosphoric acid, 172.5 grams water and 150.0 grams of urea for 15 minutes at 35° C. The pH of the solution was raised from 0.88 to 8.3 by the addition of 312.3 grams of 29% ammonium hydroxide. The solution was then reacted with 198.6 grams of 37% formaldehyde and its pH adjusted to 7.51 by the addition of 71.0 grams of 29% ammonium hydroxide. 3,000 grams of a 3.5% $P_2O_5$ treating solution was then prepared by diluting 833.3 grams of the prepared 12.6% $P_2O_5$ composition with 2,166.7 grams of water.

EXAMPLE 4

A series of southern pine samples (3/8"×¾"×40") were treated, some with the 3.5% $P_2O_5$ treating solution prepared in Example 3 and the remainder with a commercially available formulation. An initial vacuum of 28" of mercury for 30 minutes was used, followed by the addition of the 3.5% treating solution to the retort. A pressure of 140 psi was then applied to the treating solution for a period of 30 minutes. The southern pine samples were dried overnight at 49° C. and fire tested according to ASTM E-69, Standard Test Method for Combustible Properties of Treated Wood by the Fire Tube Apparatus, which is a procedure to evaluate the properties of wood in response to heat and flame under controlled laboratory conditions. Parameters measured with this test are weight loss, maximum tube temperature, flame out time, and char height. Weight loss of 30% or less and maximum tube temperatures of 316° C. or less indicates good fire retardancy. The test data is summarized in Table 1 and shows that the wood treated with the fire retardant composition treating solution of this invention has good fire retardant properties.

TABLE 1

| Treatment | #/cu. ft. $P_2O_5$ | Weight Loss (%) | Maximum Tube Temp. (°F.) | Maximum Tube Temp. (°C.) | Flame Out Time (min.) | Char Height (in.) |
|---|---|---|---|---|---|---|
| 3.5 $P_2O_5$ treating solution | 1.49 | 19.0 | 430 | 221 | 0 | 17 |
| Commercial Formulation | 1.0 | 22.7 | 420 | 216 | 0 | 20 |
| Untreated | 0.00 | >69.0 | >800 | >427 | >2 | 40 |

EXAMPLE 5

A 13.7% $P_2O_5$ fire retardant composition was prepared by reacting 77.3 grams of 85% orthophosphoric acid, 72.4 grams water and 50.0 grams of urea for 30 minutes at 25° C. The pH of the solution was adjusted from 0.89 to 8.1 by the addition of 96.6 grams of 29% ammonium hydroxide. The solution was then reacted with 34.6 grams of 37% formaldehyde for one-half hour at 70° C. The pH of the solution dropped from 8.0 to 6.82 upon complete reaction of the formaldehyde. The pH of the solution was adjusted from 6.8 to 8.0 by the addition of 16.7 grams of 29% ammonium hydroxide. 400 grams of a 4% $P_2O_5$ treating solution was then prepared by the addition of 116.8 grams of the prepared 13.7% $P_2O_5$ composition to 283.2 grams of water.

EXAMPLE 6

The 4% $P_2O_5$ treating solution prepared in Example 5 was used to treat southern pine plywood blocks (¾"×¾"×2") at an initial vacuum of 28" of mercury for 15 minutes, followed by the addition of the treating solution to the retort. The system was then pressurized for 30 minutes at a pressure of 140 psi. The treated southern pine blocks were oven-dried overnight at at 49° C. The blocks were then placed in a temperature/humidity chamber along with two blocks treated with two different commercially available fire retardant formulations and an untreated block as a control. The humidity chamber was maintained at 80° C. and a relative humidity of 64% for five weeks. The blocks were removed and examined for thermal degradation. The two blocks treated with commercial fire retardants had darkened to a dark brown or black color, which is indicative of thermal degradation. The wood in these blocks was brittle and could be easily chipped away. The blocks treated with the 4% $P_2O_5$ fire retardant composition treating solution of this invention were a light tannish brown, similar to the untreated blocks used as controls in this study. However, the wood treated with the treating solution of this invention could not be easily chipped away, as was the case with the untreated controls.

EXAMPLE 7

A 13.7% $P_2O_5$ fire retardant composition was prepared by reacting 77.3 grams of 85% orthophosphoric acid, 22.7 grams water and 71.0 grams of urea for 30 minutes at 50° C. The pH was raised to 8.3 by the addition of 96.6 grams of 29% ammonium hydroxide. The solution was then reacted with 66.7 grams of 37% formaldehyde for 15 minutes at 50° C. Upon complete reaction of the formaldehyde, the pH dropped to 6.52. 13.3 grams of 29% ammonium hydroxide was added to adjust the final pH of the solution to 7.54. A 4.0% $P_2O_5$ treating solution was prepared by diluting 347.6 grams of the prepared 13.7% $P_2O_5$ composition with 842.9 grams of water.

EXAMPLE 8

The 4.0% $P_2O_5$ treating solution prepared in Example 7 along with two commercially available formulations was used to treat southern pine blocks, and the blocks tested for thermal degradation. The wood was subjected to a vacuum of 28" of mercury for 30 minutes, followed by the addition of the treating solution to the retort. The system was then pressurized for 30 minutes at a pressure of 140 psi. The resulting treated wood was oven-dried overnight at 49° C. The pH of the treated wood before and after exposure to high temperature/humidity conditions is a test employed to determine if thermal degradation has occurred. If thermal degradation occurs a pH drop of at least 1.0 unit will be noted. This change is probably due to the hydrolysis of the phosphates in the fire retardant composition to phosphoric acid. The test data is summarized in Table 2 and shows that only small pH changes occurred with the wood that was treated with the fire retardant composition treating solution of this invention, while significant pH changes occurred with the two commercial formulations.

TABLE 2

| Treatment | Unexposed pH | Exposed pH | Change pH | Color | Comments |
|---|---|---|---|---|---|
| 4.0% $P_2O_5$ treating solution | 6.8 | 5.7 | 0.65 | Lt. Tan | Sound Wood |
| #1 Commercial Formulation | 6.10 | 4.4 | 1.76 | Black | Brittle Wood |
| #2 Commercial Formulation | 6.7 | 4.9 | 1.44 | Black | Brittle Wood |

EXAMPLE 9

Figure 2:
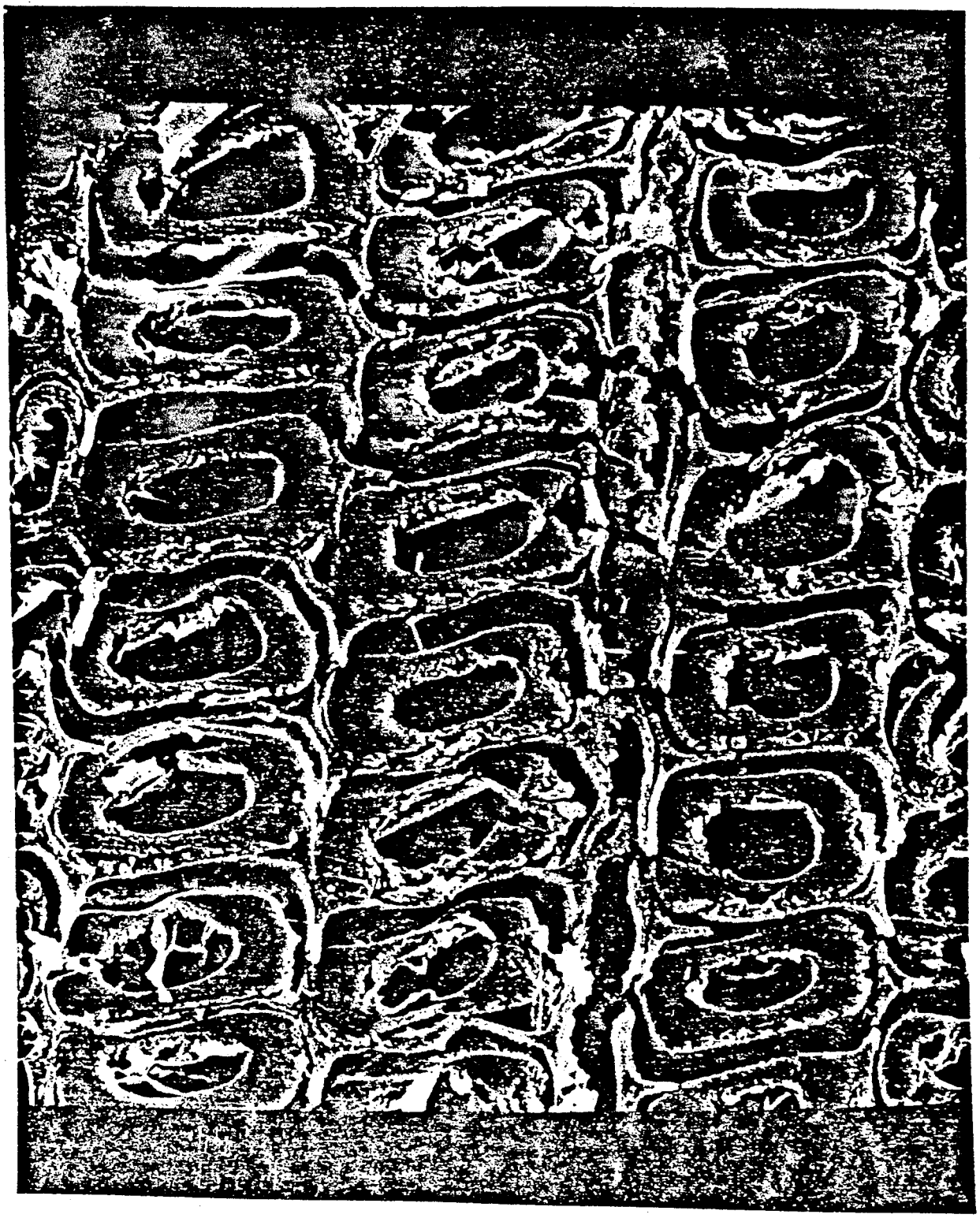
FIG. 2 shows a photograph examining the cellular structure by scanning electron microscopy of southern pine wood treated with a commercially available fire retardant formulation and placed in a temperature/humidity chamber at 80° C. and a relative humidity of 64% for five weeks.
Figure 3:
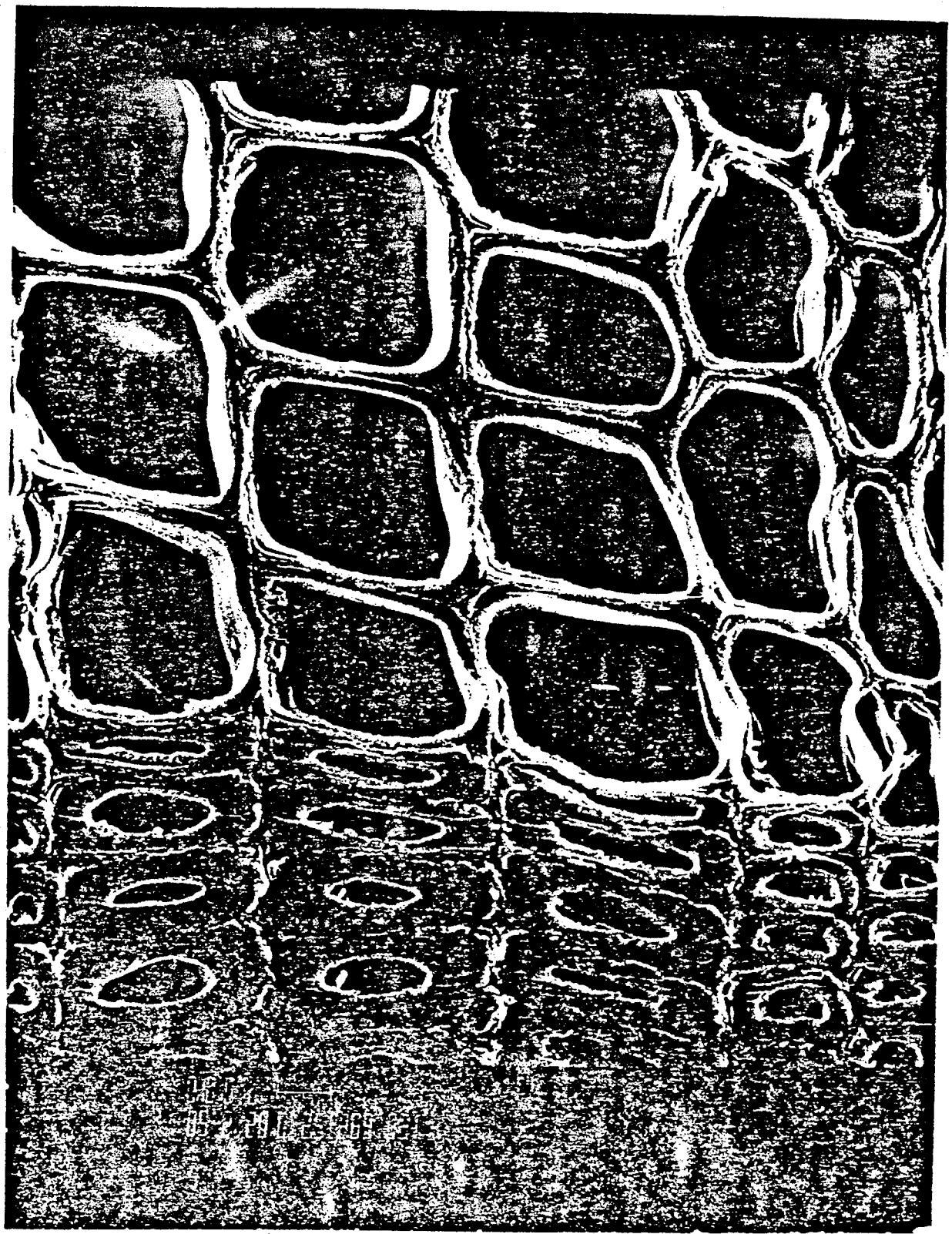
FIG. 3 shows a photograph examining the cellular structure by scanning electron microscopy of southern pine wood not treated with any fire retardant formulation and placed in a temperature/humidity chamber at 80° C. and a relative humidity of 64% for five weeks.
Figure 4:
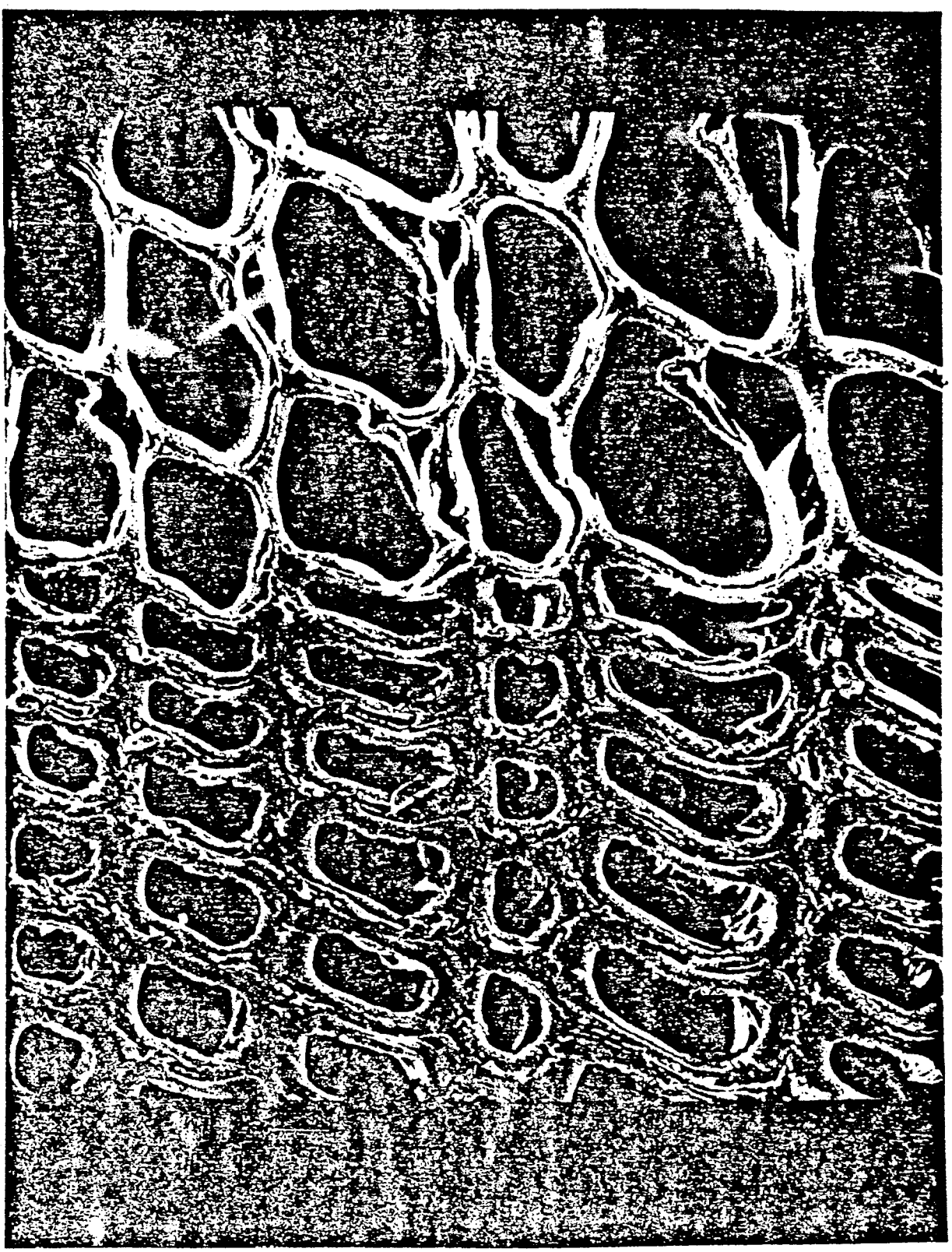
FIG. 4 shows a photograph examining the cellular structure by scanning electron microscopy of southern pine wood treated with the fire retardant composition of the present invention and placed in a temperature/humidity chamber at 80° C. and a relative humidity of 64% for five weeks.

The cellular structure of the southern pine blocks treated in Example 8 was examined using scanning electron microscopy to further determine if the fire retardant treated wood had undergone thermal degradation. It is evident from the photographs shown in FIGS. 1 and 2 that significant cellular damage occurred with the wood treated with the two commercially available formulations. However, with reference to FIG. 4, little if any cellular damage occurred in the wood treated with the fire retardant composition treating solution of the present invention when compared to the untreated exposed control shown in FIG. 3. In the commercially available formulations shown in FIGS. 1 and 2, the middle lamella, the structure that binds the cell walls together, has separated and the cell walls have undergone extensive degradation. In fact, the thermal degradation was so severe that when the samples were sectioned for examination, the earlywood (larger, less dense cells), was completely destroyed with the commercially available formulations, while the earlywood in the wood treated with the fire retardant composition treating solution of the present invention (FIG. 4) and the exposed untreated control (FIG. 3) remained intact.

EXAMPLE 10

Southern pine fire tube sticks were treated with the 4.0% $P_2O_5$ treating solution prepared in Example 7 and tested for fire retardancy according to ASTM E-69. The tube sticks were found to contain fire retardant properties as summarized in Table 3.

EXAMPLE 11

Southern pine blocks treated with the 4.0% $P_2O_5$ treating solution prepared in Example 7, blocks treated with the commercial formulations and untreated blocks were placed in a humidity chamber and maintained at 80° C. at a relative humidity of 64% for five weeks to determine if the treated blocks would undergo thermal degradation. After five weeks exposure the blocks treated with the fire retardant composition treating solution of this invention had a slight color change to a light tannish color, similar to the untreated blocks and showed no evidence of thermal degradation. However, the blocks treated with the commercial formulations showed significant thermal degradation after the five weeks exposure. That is, blocks turned a black color and the wood was extremely brittle.

It will be understood that the foregoing description and illustration is by way of example only and that such modifications and changes as may suggest themselves to those skilled in the art are intended to fall within the scope of the present invention as defined by the appended claims.

What is claimed is:

1. A process for forming a fire retardant composition useful for treating cellulosic materials to impart both fire retardant properties and improved thermal stability under high temperature and humidity conditions which comprises:

(a) reacting a solution of water, an oxy acid of phosphorus and a nitrogen containing compound selected from the group consisting of urea, melamine, mono, di and trimethylamine, mono, di, and triethylamine, dicyandiamide, hexamethylenetetramine and other equivalent nitrogen containing compounds in a weight ratio of about 0.1 to about 15 oxy acid per part nitrogen compound for a time of about 15 minutes to about 3 hours at a temperature from about 25° C. to about 90° C.;

(b) adjusting the pH of said solution from about 6.0 to about 9.0 with a water soluble alkaline compound selected from the group consisting of ammonia, ammonium hydroxide, mono, di and trimethylamine, mono, di and triethylamine and ethanolamine or other equivalent nitrogen containing alkaline compounds;

(c) reacting said solution with an aldehyde compound selected from the group consisting of formaldehyde, acetaldehyde, and glyoxal in a weight ratio of about 1.0 to about 56 total initial oxy acid per part aldehyde compound for a time of about 5 minutes to about 1.5 hours at a temperature from about 25° C. to about 90° C.; and (d) adjusting the final pH of said solution from about 7.0 to about 8.5 with a water soluble alkaline compound selected from the group consisting of ammonia, ammonium hydroxide, mono, di and trimethylamine, mono, di and triethylamine and ethanol-

TABLE 3

| Treatment | #/cu.ft. $P_2O_5$ | Weight Loss (%) | Maximum Tube Temp. (°F.) | Maximum Tube Temp. (°C.) | Flame Out Time (min.) | Char Height (in.) |
|---|---|---|---|---|---|---|
| $P_2O_5$ treating solution | 1.76 | 20.6 | 440 | 227 | 0 | 20 |
| Untreated | 0.00 | >69.0 | >800 | >427 | >2 | 40 | amine or other equivalent nitrogen containing alkaline compounds.

2. The process of claim 1, wherein said oxy acid of phosphorus is selected from the group consisting of hypophosphorus acid, phosphorous acid, phosphoric acid, hypophosphoric acid, pyrophosphoric acid, orthophosphoric acid or other equivalent oxy acids.

3. The process of claim 2, wherein said oxy acid of phosphorus is orthophosphoric acid.

4. The process of claim 1, wherein said nitrogen containing compound is urea.

5. The process of claim 1, wherein said water soluble alkaline compound is ammonium hydroxide.

6. A process for forming a fire retardant composition useful for impregnating cellulosic materials therewith to impart both fire retardant properties and improved thermal stability under high temperature and humidity conditions which comprises:
   (a) reacting a solution of water, orthophosphoric acid and urea in a weight ratio of about 0.1 to about 15 orthophosphoric acid per part urea for a time of about 15 minutes to about 3 hours at a temperature from about 25° C. to about 90° C.;
   (b) adjusting the pH of said solution from about 6.0 to about 9.0 with ammonium hydroxide;
   (c) reacting said solution with formaldehyde in a weight ratio of about 1.0 to about 56 total initial orthophosphoric acid per part formaldehyde for a time of about 5 minutes to about 1.5 hours at a temperature from about 25° C. to about 90° C.; and
   (d) adjusting the final pH of said solution from about 7.0 to about 8.5 with ammonium hydroxide.

7. The process of claim 6, wherein said orthophosphoric acid to urea mole ratio is about 1.0.

8. The process of claim 6, wherein said orthophosphoric acid to urea weight ratio of is from about 1.0 to about 2.0.

9. The process of claim 6, wherein said total unreacted orthophosphoric acid to formaldehyde weight ratio is from about 1.5 to about 10.

10. The process of claim 6, wherein said cellulosic material is wood.

11. The process of claim 6, wherein the temperature is at about 60° C. to about 70° C.

12. The process of claim 6, wherein said total initial phosphoric acid to formaldehyde mole ratio is about 1.5.

13. A fire retardant composition comprised in accordance with the process of claim 1.

14. A fire retardant composition comprised in accordance with the process of claim 6.

15. A method of treating a cellulosic material to impart fire retardance and improved thermal stability under high temperature and humidity conditions comprising the steps of:
   (a) forming a fire retardant composition by reacting a solution of water, an oxy acid of phosphorus and a nitrogen containing compound selected from the group consisting of urea, melamine, mono, di and trimethylamine, mono, di, and triethylamine, dicyandiamide, hexamethylenetetramine and other equivalent nitrogen containing compounds in a weight ratio of about 0.1 to about 15 oxy acid per part nitrogen compound for a time of about 15 minutes to about 3 hours at a temperature from about 25° C. to about 90° C.; adjusting the pH of said solution from about 6.0 to about 9.0 with a water soluble alkaline compound selected from the group consisting of ammonia, ammonium hydroxide, mono, di and trimethylamine, mono, di and triethylamine and ethanolamine or other equivalent nitrogen containing alkaline compounds; reacting said solution with an aldehyde compound selected from the group consisting of formaldehyde, acetaldehyde, and glyoxal in a weight ratio of about 1.0 to about 56 total initial oxy acid per part aldehyde compound for a time of about 5 minutes to about 1.5 hours at a temperature from about 25° C. to about 90° C.; and adjusting the final pH of said solution from about 7.0 to about 8.5 with a water soluble alkaline compound selected from the group consisting of ammonia, ammonium hydroxide, mono, di and trimethylamine, mono, di and triethylamine and ethanolamine or other equivalent nitrogen containing alkalinecompounds; and
   (b) impregnating said cellulosic material with a fire retardant amount of said fire retardant composition of step (a).

16. The method of claim 15, wherein said method further comprises the step of:
   diluting said fire retardant composition with an aqueous solvent to form a treating solution for application to said cellulosic material.

17. The method of claim 15, wherein said cellulosic material is treated with from about 0.5% to about 10% of said fire retardant composition.

18. The method of claim 15, wherein said cellulosic material is selected from the group consisting of wood, paper, rayon or cotton.

19. The method of claim 18, wherein said cellulosic material is wood.

20. A cellulosic material impregnated with a fire retardant amount of the fire retardant composition made in accordance with the process of claim 1.

21. A cellulosic material impregnated with a fire retardant amount of the fire retardant composition made in accordance with the process of claim 6.

22. A cellulosic material impregnated with a fire retardant amount of the fire retardant composition in accordance with the method of claim 15.

* * * * *